US010143966B1

(12) United States Patent
Gunugunuri et al.

(10) Patent No.: US 10,143,966 B1
(45) Date of Patent: Dec. 4, 2018

(54) POTASSIUM DISPERSED ON SPINEL OXIDES AS CATALYSTS FOR DIRECT NOX DECOMPOSITION (71) Applicant: Toyota Motor Engineering & Manufacturing North America, Inc., Erlanger, KY (US)

(72) Inventors: Krishna Gunugunuri, Canton, MI (US); Charles Alexander Roberts, Farmington Hills, MI (US); Torin C. Peck, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/605,325

(22) Filed: May 25, 2017

(51) Int. Cl.
*B01J 23/00* (2006.01)
*B01J 23/745* (2006.01)
(Continued)

(52) U.S. Cl.
CPC ........ *B01D 53/9413* (2013.01); *B01J 23/005* (2013.01); *B01J 23/04* (2013.01); *B01J 23/755* (2013.01); *B01J 35/0006* (2013.01); *B01J 35/0013* (2013.01); *B01J 35/0066* (2013.01); *B01J 37/0211* (2013.01); *B01J 37/0213* (2013.01); *B01J 37/0236* (2013.01); *B01J 37/088* (2013.01); *F01N 3/2066* (2013.01);
(Continued)

(58) Field of Classification Search
CPC ........ B01J 23/005; B01J 23/04; B01J 23/755; B01J 23/745; B01J 23/78; B01J 35/0006; B01J 35/0013; B01J 35/0066; B01J 37/0211; B01J 37/0213; B01J 37/0236; B01J 37/088; B01D 53/9413; F01N 3/2066

See application file for complete search history.

(56) References Cited

U.S. PATENT DOCUMENTS

| 4,790,982 A | * | 12/1988 | Yoo | ........................ | B01J 23/005 |
| | | | | | 208/113 |
| 4,916,105 A | * | 4/1990 | Rieck | .................... | B01D 53/945 |
| | | | | | 502/303 |
| 2009/0038297 A1 | | 2/2009 | Nair et al. | | |

OTHER PUBLICATIONS

Pudukudy, M. et al., "Methane decomposition over unsupported mesoporous nickel ferrites: effect of reaction temperature on the catalytic activity and properties of the produced nanocarbon," RSC Advances, Issue 72, pp. 68081-68091 (2016).

(Continued)

*Primary Examiner* — Cam N. Nguyen
(74) *Attorney, Agent, or Firm* — Christopher G. Darrow; Darrow Mustafa PC (57) ABSTRACT

Active catalysts for the treatment of a low temperature exhaust gas stream are provided containing potassium (K) dispersed on a spinel oxide for the direct, lean removal of nitrogen oxides from the exhaust gas stream. The low temperature (from about 400° C. to about 650° C.), direct decomposition is accomplished without the need of a reductant molecule. In one example, K may be dispersed on a surface of a metal oxide support, such as $NiFe_2O_4$ spinel oxide, synthesized using wet impregnation techniques. The $K/NiFe_2O_4$ catalyst system converts nitric oxide to nitrogen gas with high product specificity, up to 100%, avoiding the production of a significant concentration of the undesirable $N_2O$ product.

13 Claims, 6 Drawing Sheets

(51) Int. Cl.
  *B01J 23/755*  (2006.01)
  *B01J 23/78*   (2006.01)
  *B01J 35/00*   (2006.01)
  *B01J 37/02*   (2006.01)
  *B01J 37/08*   (2006.01)
  *B01D 53/94*   (2006.01)
  *F01N 3/20*    (2006.01)
  *B01J 23/04*   (2006.01)

(52) U.S. Cl.
  CPC .......... *B01D 2255/2022* (2013.01); *B01D 2255/20738* (2013.01); *B01D 2255/20753* (2013.01); *B01D 2255/405* (2013.01); *B01D 2255/9202* (2013.01)

(56) References Cited

OTHER PUBLICATIONS

Haneda, M. et al., "Alkali metal-doped cobalt oxide catalysts for NO decomposition," Applied Catalysis B, Environmental, 46, pp. 473-482 (2003).

Park, P.W. et al., "NO decomposition over sodium-promoted cobalt oxide," Catalysis Today, Issue 42, pp. 51-60 (1998).

\* cited by examiner

POTASSIUM DISPERSED ON SPINEL OXIDES AS CATALYSTS FOR DIRECT NOX DECOMPOSITION

TECHNICAL FIELD

The present disclosure generally relates to catalysts for treatment of an exhaust gas stream and, more particularly, to catalysts containing potassium on a spinel for removal of nitrogen oxides from an exhaust gas stream as generated by an internal combustion engine, or the like.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Catalysts effective at removing NOx from exhaust emissions are desirable in order to protect the environment and to comport with regulations directed to that purpose. It is preferable that such catalysts convert NOx to inert nitrogen gas, instead of converting NOx to other nitrogen-containing compounds. Catalysts that are effective at low temperature may have additional utility for vehicles.

Increasingly stringent NOx emission and fuel economy requirements for vehicles and automobile engines will require catalytic NOx abatement technologies that are effective under lean-burn conditions. Direct NOx decomposition to $N_2$ and $O_2$ is an attractive alternative to NOx traps and selective catalytic reduction (SCR) for this application, as NOx traps and SCR processes are highly dependent on reductants (such as unburned hydrocarbons or CO) to mitigate NOx. The development of an effective catalyst for direct NOx decomposition would eliminate the use of reducing agents, simplifying the NOx removal process, and therefore decreasing the fuel efficiency cost of NOx abatement.

However, most catalysts active for direct NOx decomposition are only efficient at high temperatures (i.e., greater than about 600° C.), which severely limits a practical application for a vehicle exhaust gas stream. The most well-known low temperature (i.e., less than about 500° C.) direct NOx decomposition catalysts include Cu-ZSM5, $K/Co_3O_4$, $Na/Co_3O_4$, CuO, and $Ag/Co_3O_4$. However, low temperature activity and selectivity to $N_2$ for all of these catalysts is not sufficient for practical application, and more advancements are needed. Advancements in direct NOx decomposition catalysis based on structure activity relationships are lacking, and methodology to improve the performance of specific catalyst systems is needed.

Accordingly, it would be desirable to provide a catalyst for the removal of NOx from exhaust gas, that is effective at low temperature and that has high $N_2$ product specificity.

SUMMARY

This section provides a general summary of the disclosure, and is not a comprehensive disclosure of its full scope or all of its features.

In various aspects, the present teachings provide a catalyst system for the direct decomposition removal of $NO_x$ from an exhaust gas stream. In certain preferred aspects, the exhaust gas stream may be provided at a temperature of from about 400° C. to about 650° C. The catalyst system may include $NiFe_2O_4$ spinel oxide, and an alkali metal, such as potassium, dispersed on a surface of the $NiFe_2O_4$ spinel oxide. The catalyst system is configured to catalyze decompose NOx to generate $N_2$ without the presence of a reductant. The potassium may be provided in an amount of from about 0.5 wt % to about 1.5 wt %, or from about 0.5 wt % to about 1.0 wt % of the catalyst system, or in an amount of about 0.9 wt % of the catalyst system.

In other aspects, the present teachings provide a catalytic converter for the direct decomposition removal of $NO_x$ from an exhaust gas stream. The exhaust gas stream may be provided flowing through the catalytic converter at a temperature of from about 400° C. to about 650° C. The catalytic converter may include an inlet configured to receive the exhaust gas stream into an enclosure, and an outlet configured to allow the exhaust gas stream to exit the enclosure. A catalyst system may be contained inside the enclosure, the catalyst system including potassium dispersed on a $NiFe_2O_4$ metal oxide, configured to catalyze a reduction of the NOx to generate $N_2$ without the presence of a reductant.

In still further aspects, the present teachings provide methods for the direct decomposition removal of $NO_x$ from a low temperature exhaust gas stream. The methods may include flowing the exhaust gas stream through a catalyst system. This includes exposing the exhaust gas stream to a catalyst including potassium dispersed on a surface of a $NiFe_2O_4$ metal oxide support. The exposure results in catalyzing a reduction of the NOx to generate $N_2$ without the presence of a reductant. In various aspects, potassium is provided in an amount of about 0.9 wt % of the catalyst system. Flowing the exhaust gas stream through the catalyst system at a temperature at or greater than about 450° C. may result in obtaining an NOx selectivity to $N_2$ greater than about 95%, and up to 100%.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide an active catalyst system for the treatment of a low temperature exhaust gas stream. The catalyst system includes the dispersion or impregnation of potassium (K), an alkali metal, onto a surface of a $NiFe_2O_4$ metal oxide, such as a spinel, for the direct, lean removal of nitrogen oxides from the exhaust gas stream. This catalyst system has shown to vastly improve the direct NOx activity as well as $N_2$ selectivity. The direct NOx activity of $NiFe_2O_4$ increases with increasing K loading up to an optimum of 0.9 wt %. Further increase in the K loading leads to a decrease in the direct NOx activity. Importantly, the selectivity towards $N_2$ increases with increasing K loading, and 1.5 wt % $K/NiFe_2O_4$ exhibited 100% $N_2$ selectivity at 450° C. X-ray powder diffraction measurements show that K was well dispersed on the surface of $NiFe_2O_4$ and does not significantly affect the $NiFe_2O_4$ structure during calcination or under direct NOx decomposition reaction conditions. In-situ FT-IR measurements during $NO_x$ adsorption at 300° C. show that impregnation of K on $NiFe_2O_4$ creates new NOx adsorption sites which yield very active nitrite intermediates that lead to the increased the direct NOx activity. $O_2$-TPD measurements show that impregnation of 0.5 wt % and 0.9 wt % K on the $NiFe_2O_4$ surface do not significantly alter the oxygen release characteristics of the $NiFe_2O_4$. However, at 1.5 wt % K, the bulk oxygen release shifts to higher temperature which is responsible for the decrease in activity compared to the 0.9 wt % K. These results show that direct NOx activity is optimized over catalysts with both lower temperature oxygen release characteristics and NOx adsorption sites that yield surface nitrites species.

The low temperature (i.e., from about 400° C. to about 650° C.), direct decomposition is accomplished without the need of a reductant (i.e., $H_2$, CO, $C_3H_6$ or other hydrocarbons, and/or soot), thereby improving fuel efficiency. Direct decomposition, as discussed herein, refers to catalytic transformation of nitrogen oxides to elemental nitrogen and oxygen. This differs, for example, from catalytic reduction of nitrogen oxides to ammonia and water. In one example, K may be dispersed or substantially uniformly spread out on a surface of a metal oxide support, such as the $NiFe_2O_4$ spinel oxide, synthesized using a wet impregnation technique. The $K/NiFe_2O_4$ catalyst system converts nitric oxide to nitrogen gas with high product specificity, all while avoiding the production of a significant concentration of the undesirable $N_2O$ product. In various preferred aspects, the $K/NiFe_2O_4$ catalyst may be operable at exhaust gas/stream temperatures lower than about 650° C., lower than about 600° C., lower than about 550° C., lower than about 500° C., lower than about 450° C., and even lower than or at about 400° C.

The presently disclosed catalyst system includes methods for dispersing potassium on a metal oxide support, specifically a spinel oxide (i.e., $NiFe_2O_4$), via wet impregnation techniques. This method particularly provides for improved total yield of product $N_2$ and product selectivity to $N_2$ (versus undesired $N_2O$ and/or $NO_2$ products) during low temperature direct NOx decomposition as compared to either the bare $NiFe_2O_4$ spinel oxide support only. Because of the high selectivity to $N_2$ for the present teachings, the undesirable $N_2O$ product is not produced in a significant quantity during the direct NO decomposition over $NiFe_2O_4$ spinel-supported potassium. Additionally, it has been discovered that, on a wt % basis, the addition of about 0.9 wt % K to the surface of the $NiFe_2O_4$ spinel improves the selectivity to the $N_2$ product from 20% (without K) to greater than about 85% at a temperature of about 450° C., and greater than about 95% at a temperature of about 500° C. The addition of about 1.5 wt % K to the surface of the $NiFe_2O_4$ spinel improves the selectivity to about 100% at all temperatures of from about 450° C. to about 650° C.

As detailed herein, the present teachings not only include the development of the catalyst system, but also the utilization of the catalyst system with exhaust gas streams, particularly with catalytic converters for vehicles, automobiles, and the like, as well as including methods of synthesizing the potassium supported in the spinel oxide.

Furthermore, the activity of the spinel supported potassium can be optimized by different loadings, or the amount of potassium present in the catalyst system by weight. For example, in various preferred aspects, the potassium is present in amount of from about 0.5 wt % to about 1.5 wt % of the catalyst, or from about 0.5 wt % to about 1 wt %, or in an amount of about 0.9 wt %. In one specific example, the addition of potassium in the catalyst system improves the activity by about twenty (20) times at about 650° C. as compared to a $NiFe_2O_4$ catalyst without the presence of potassium.

The catalyst systems of the present disclosure can be used in a chamber or an enclosure, such as a catalytic converter, having an inlet and an outlet. As is commonly known to those of ordinary skill in the art, such a chamber or enclosure can be configured to receive an exhaust gas stream through the inlet and to exit the exhaust gas stream through the outlet, such that the exhaust gas stream has a particular or defined flow direction.

Examples

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Synthesis and Material Characterization

The $NiFe_2O_4$ may be purchased from a commercial supplier, such as Sigma Aldrich, and calcined at about 400° C. for about 1 hour. In various aspects, the $NiFe_2O_4$ may be in a nanoparticle form, having an average diameter of from about 2 nm to about 100 nm.

The $K/NiFe_2O_4$ catalyst systems according to the present technology may be synthesized by using a wet impregnation method. In one exemplary synthesis procedure, 5 g of $NiFe_2O_4$ can be mixed with 50 mL of water. Next, the required quantity of potassium hydroxide can be dissolved separately in deionized water and combined with the $NiFe_2O_4$ suspension. The mixture may then be heated to about 80° C. with continuous stirring. The resulting powder can be dried in an oven at about 120° C. for about 12 h under air. Finally, the catalyst system can be calcined at about 400° C. for about 1 h in the presence of air with a 1° C./min ramp. Different loadings of K, for example, 0.5 wt %, 0.9 wt %, and 1.5 wt % on $NiFe_2O_4$ can be synthesized using a similar procedure by changing the amount of potassium hydroxide precursor during the synthesis as is conventionally done.

The phase composition of spinels can be measured using X-ray diffraction measurements. In one example, X-ray powder diffraction (XRD) measurements can be performed using a Rigaku SmartLab X-Ray Diffractometer. Spectra can be collected over a 2θ range of between about 20 to about 80 degrees, at a rate of about 0.5 deg./min, and with a step size of about 0.02 deg./step. Structural assignments can then be made using PDXL software. The phase composition of the materials can be determined using an ICDD-PDF database.

Oxygen release characteristics of the $NiFe_2O_4$ and $K/NiFe_2O_4$ catalysts can be studied using $O_2$ temperature programmed desorption ($O_2$ TPD) experiments. In one example, $O_2$ TPD experiments can be performed using a NETZSCH STA-449 thermogravimetric analyzer equipped with mass spectrometer. Before the experiment, the catalysts may be preheated to about 300° C. in the presence of 20% $O_2$/He. After the pretreatment, the temperature can be decreased to about 100° C. Oxygen release characteristics can be studied by heating the catalyst from between about 100° C. to about 600° C. in the presence of helium. The oxygen signal can be monitored using mass spectrometry. The $O_2$ TPD profiles can be presented with temperature as a function of the amount of oxygen released. Typically, behavior for the catalysts can be as follows: physisorbed oxygen releases below about 200° C., chemisorbed oxygen releases from between about 200° C. to about 450° C., and finally the bulk oxygen releases after about 450° C.

The NO adsorption properties can be measured using in situ Fourier transform infrared (FT-IR) spectroscopic measurements. In one example, a Harrick High Temperature Cell with environmental (gas flow) and temperature control can be used for in situ diffuse-reflectance FT-IR spectroscopy. Spectra can be recorded using a Thermo Scientific Nicolet 8700 Research FT-IR Spectrometer equipped with a liquid $N_2$ cooled MCT detector. Spectra can be obtained with a resolution of 2 cm' and by averaging 64 scans. In situ diffuse-reflectance FT-IR spectra can be collected during NO adsorption at about 300° C. Prior to NO adsorption, the sample can first be pretreated at about 350° C. in 30 ml/min of 10% $O_2$/He. The background spectrum (64 scans) is of the catalyst after cooling to about 300° C. in 30 ml/min of UHP He. Adsorption of NO can be achieved by flowing 30 ml/min of 1% NO over the catalyst for about 25 min. Adsorption of NO can be allowed to proceed for about 25 min while spectra is obtained every minute using a series collection. To compare peak intensities among different catalyst samples, the adsorption spectra can be normalized to the NO gas phase peak at about 1876/cm.

The direct NOx decomposition measurements for the present technology may be performed in a fixed bed flow reactor following a predetermined scheme. For example, a pretreatment step may begin with catalysts being pretreated at a temperature of about 500° C. in the presence of 20% $O_2$/He. After the pretreatment, the bed temperature is decreased to about 350° C. before direct NOx decomposition measurements are collected. The direct NOx decomposition measurements are performed using about 1% $NO_x$ balance helium with a gas hourly space velocity of 2,100/h and in the temperature regions of about 350° C.-650° C. For example, the temperature is held at 350° C. for about 2 hours, raised to 450° C. for about two hours, continuing up to 550° C. for about two hours, and then up to about 650° C. for about two hours.

Performance Evaluation

For direct NOx decomposition to occur, NO must directly decompose to $N_2$ and $O_2$ over the catalyst surface. However, there is a possibility for unwanted $N_2O$ and $NO_2$ formation as side products. Therefore, in addition to high NO conversion, it is also very important to have higher selectivity towards $N_2+O_2$ formation rather than $N_2O$ or $NO_2$. The reaction can be represented as:

$$(4a+4c-2b)NO \rightarrow aN_2+bO_2+cN_2O+(2a-2b+c)NO_2$$

In this regard, the selectivity towards $N_2$ can be defined as:

$$N_2 \text{ selectivity } (\%) = 2*[N_2]/(2*[N_2]+0.5[N_2O]+[NO_2])$$

For the performance evaluation considerations, the catalyst systems of the present technology are first calcined at about 400° C. for about 1 hour. After being calcined, direct NOx decomposition is performed over $NiFe_2O_4$ and various $K/NiFe_2O_4$ catalysts.

Figure 1:
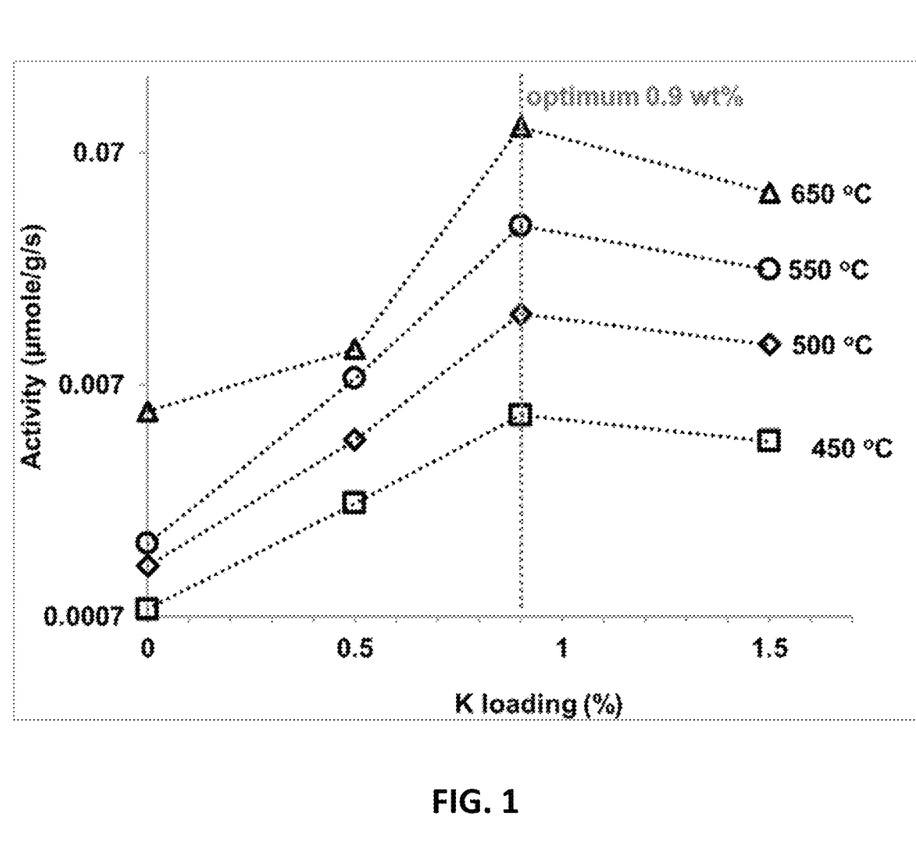
FIG. 1 illustrates NO conversion profiles (activity) over $NiFe_2O_4$ and $K/NiFe_2O_4$ catalysts with respect to weight percentage of potassium loading at various reaction temperatures.

FIG. 1 illustrates the NOx activity of the $NiFe_2O_4$ and various $K/NiFe_2O_4$ catalyst systems as a function of potassium weight percent loading for various reaction temperatures. As shown in FIG. 1, the NOx decomposition activity increases with increasing temperature from 450° C. to 650° C. for all of the wt % K loadings. As clearly shown, the addition of potassium to the $NiFe_2O_4$ spinel improves the direct NOx decomposition activity at all temperatures. The activity increases with increasing potassium loading, up to an optimum loading of 0.9 wt % K. Further increases in the potassium loading leads to a slight decrease in the activity. As shown, the 0.9 wt % $K/NiFe_2O_4$ exhibits an activity greater than about 0.07 μmol/g/s, which is about twenty (20) times higher at 650° C. as compared to the activity of the $NiFe_2O_4$ catalyst without potassium.

Figure 2:
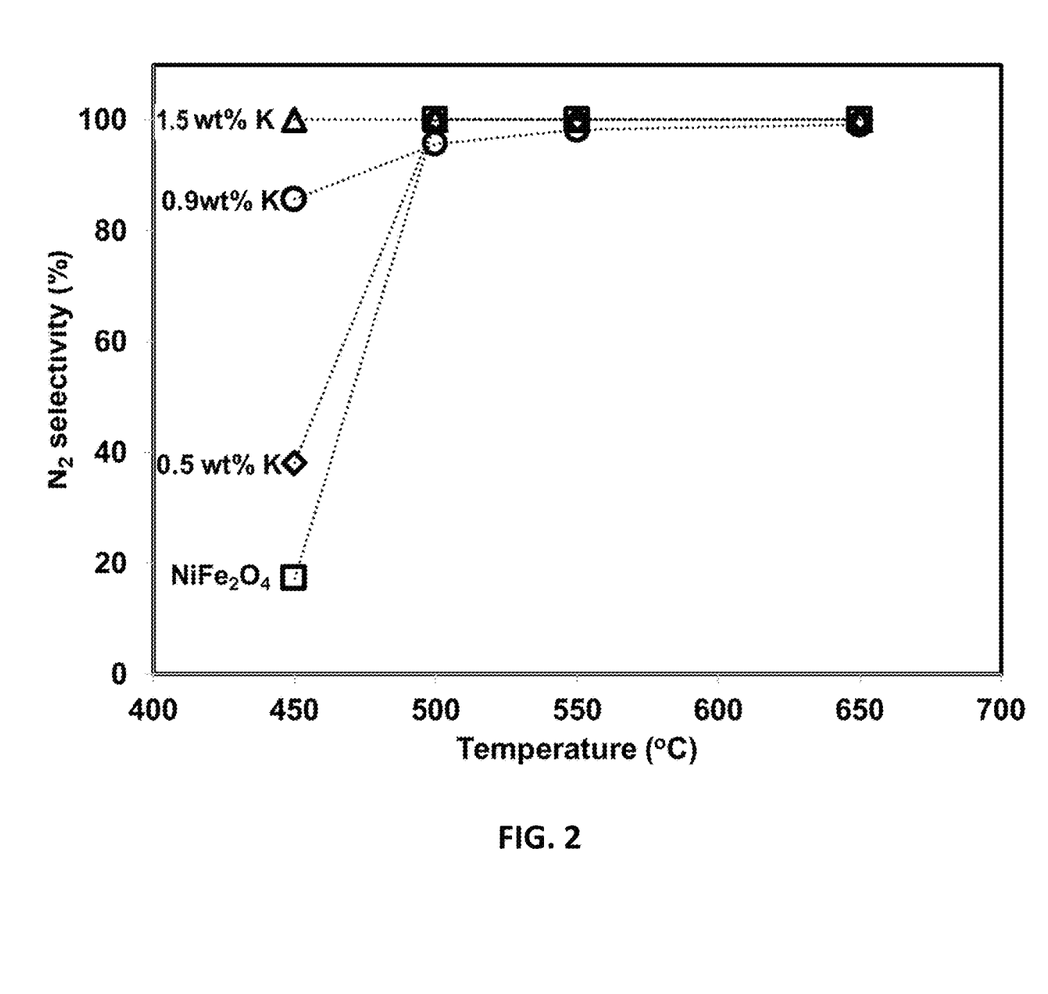
FIG. 2 illustrates $N_2$ selectivity profiles over $NiFe_2O_4$ and $K/NiFe_2O_4$ catalysts with respect to a weight percentage of potassium loading.

To confirm direct NOx decomposition to $N_2$ is taking place, rather than the unwanted side products of $N_2O$ or $NO_2$, the $N_2$ selectivity may be calculated. Using the FTIR detector for product analysis, it is possible to detect NO, $N_2O$, and $NO_2$ species from the outlet of the reactor during direct NOx decomposition evaluation. FIG. 2 illustrates the $N_2$ selectivity profiles calculated for the $NiFe_2O_4$ and $K/NiFe_2O_4$ spinels from 450° C. to 650° C. As shown in FIG. 2, the $N_2$ selectivity increases with increasing potassium loading on $NiFe_2O_4$. Remarkably, addition of 1.5 wt % K to the $NiFe_2O_4$ improves the $N_2$ selectivity from about 17% (without potassium) to 100% at 450° C. Additionally, as shown, all of the catalyst systems exhibit nearly 100% $N_2$ selectivity as tested in a temperature range from between about 500° C. to 650° C. These results suggest that $K/NiFe_2O_4$ catalysts have the potential as very good candidates for direct NOx decomposition because they exhibit very good activity and selectivity to $N_2$ at temperatures as low as 450° C.

Figure 3:
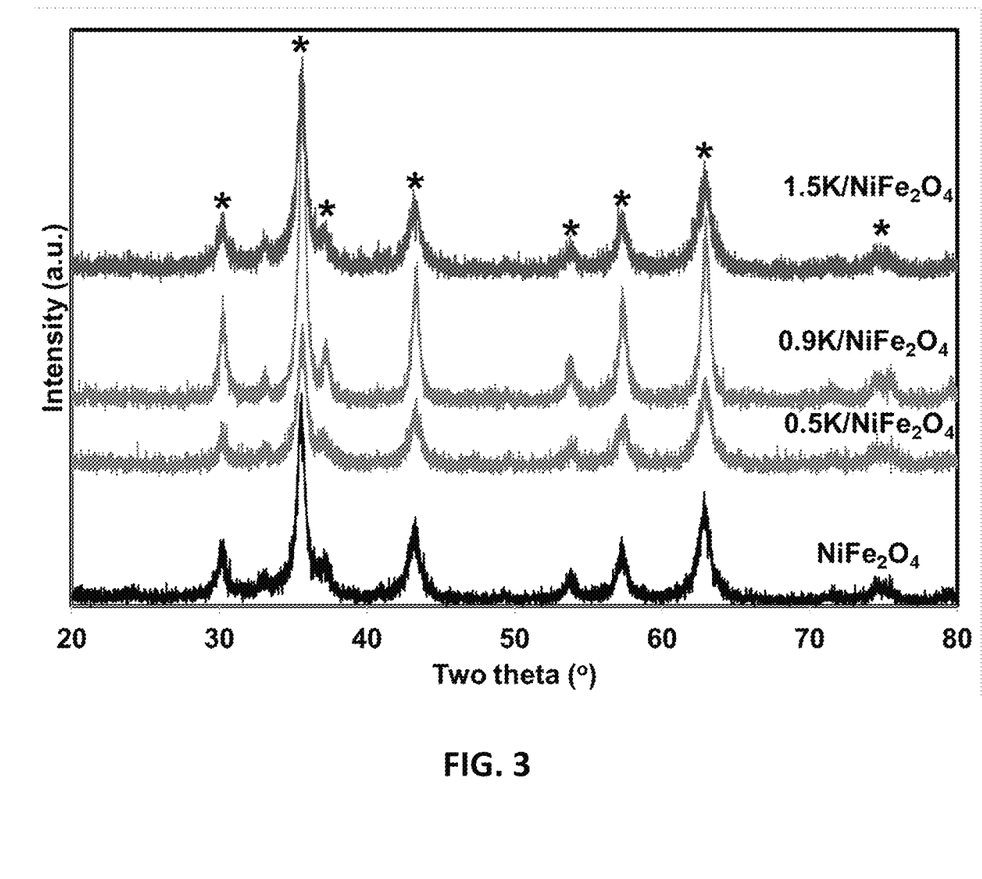
FIG. 3 illustrates x-ray diffraction profiles of the $NiFe_2O_4$ and $K/NiFe_2O_4$ catalysts at various weight percentages after calcination.

The performance evaluation of the present technology also includes structural and surface characterization measurements. For example, these characterizations can be performed over $NiFe_2O_4$, and $K/NiFe_2O_4$ catalysts to better understand the influence of potassium deposition on the $NiFe_2O_4$ spinel. In this regard, FIG. 3 illustrates X-ray diffraction (XRD) profiles of $NiFe_2O_4$ and $K/NiFe_2O_4$ catalysts after calcination. As shown, after calcination, $NiFe_2O_4$ exhibits peaks at 30.14, 35.94, 37.31, 43.34, 53.86, 57.45, 62.93 degrees. These 2θ values correspond to reflections of (220), (311), (222), (400), (422), (511), and (440) planes that are indications of the presence of the cubic spinel structure. These diffraction lines provide clear evidence of the presence of $NiFe_2O_4$. For example, all of the diffraction peaks match well with the reported values (JCPDS file No: 10-325), and are indexed with the lattice parameter of a=8.339±1° A. All of the potassium loaded K/NiFe$_2$O$_4$ catalyst systems exhibit reflections similar to NiFe$_2$O$_4$. No additional peaks are observed. Additionally, no shift in the peak positions are observed. These results suggest that potassium is well dispersed over the surface of NiFe$_2$O$_4$ and did not incorporate into the spinel structure in a way that was significant enough to effect the long range order of the system.

Figure 4:
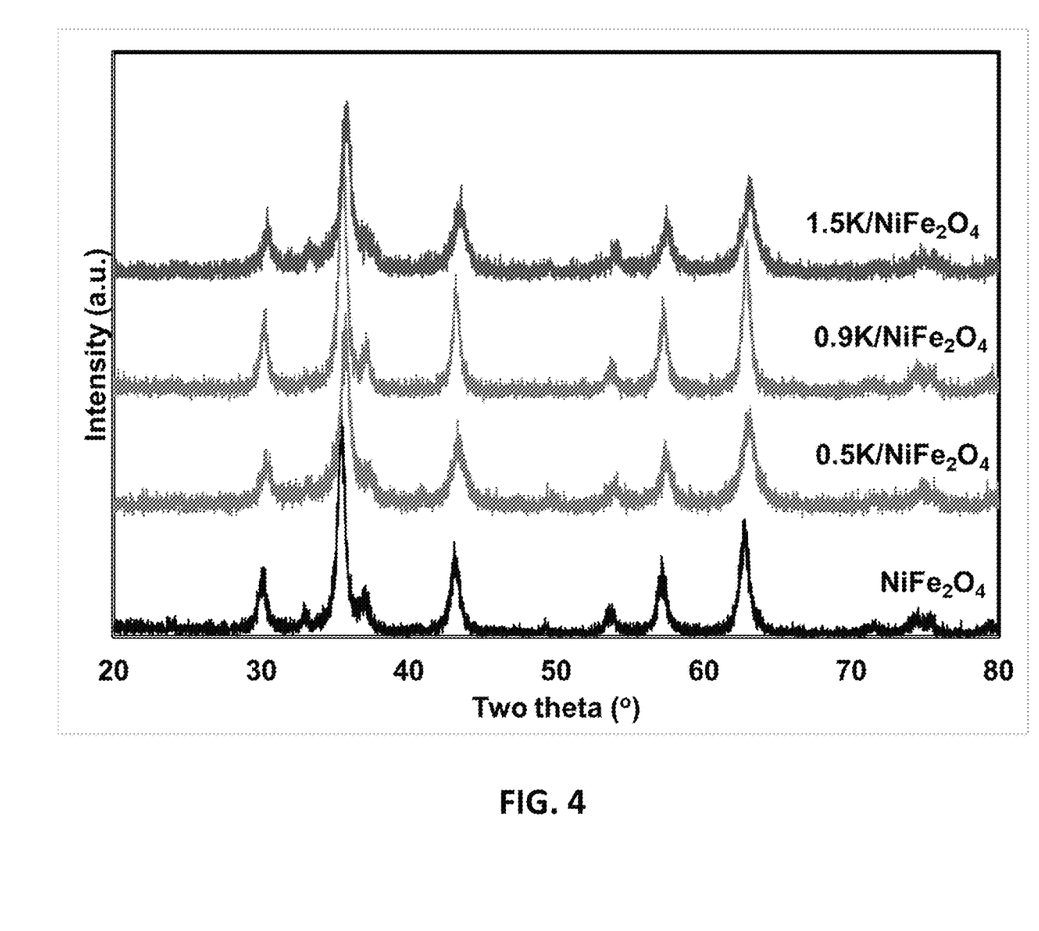
FIG. 4 illustrates x-ray diffraction profiles of the $NiFe_2O_4$ and $K/NiFe_2O_4$ catalysts at various weight percentages after the direct NOx decomposition.

FIG. 4 illustrates the X-ray powder diffraction patterns of the NiFe$_2$O$_4$ and K/NiFe$_2$O$_4$ catalysts after the direct NOx decomposition. The NiFe$_2$O$_4$ exhibits peaks due to only spinel NiFe$_2$O$_4$ after the direct NOx decomposition. No additional peaks are observed, for example, due to either Fe$_2$O$_3$ or NiO. This finding does not explain the role of K, but suggests another reason why NiFe$_2$O$_4$ is a very good candidate for direct NOx decomposition, i.e. structural stability during reaction. All the potassium impregnated NiFe$_2$O$_4$ catalyst systems exhibit similar peaks in the X-ray diffraction pattern as NiFe$_2$O$_4$ after the direct NOx decomposition. These results show that the potassium addition does have a detectable effect on the structure of NiFe$_2$O$_4$ during calcination or during the direct NOx decomposition.

Figure 5:
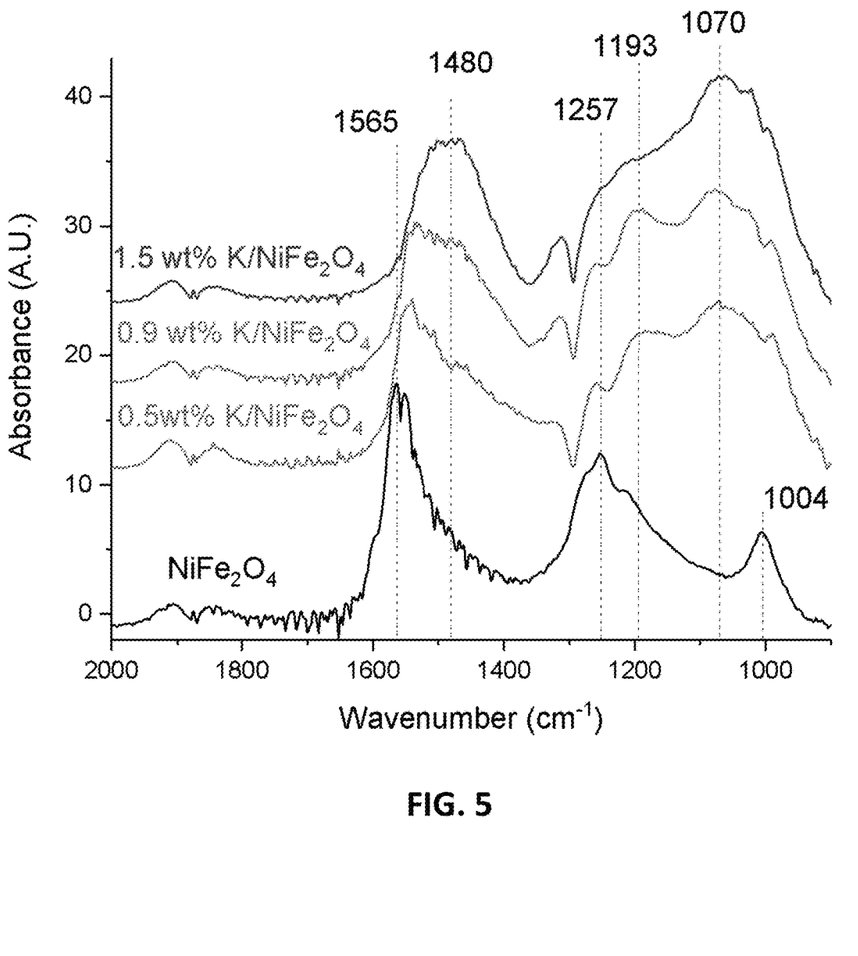
FIG. 5 illustrates in-situ FT-IR spectra for $NiFe_2O_4$ and $K/NiFe_2O_4$ catalysts at various weight percentages during the NOx adsorption at 300° C.

The NOx adsorption properties of NiFe$_2$O$_4$ and K/NiFe$_2$O$_4$ catalysts can be investigated using in situ FT-IR spectroscopic measurements. FIG. 5 illustrates the in situ FT-IR spectra of NiFe$_2$O$_4$ and K/NiFe$_2$O$_4$ catalyst systems during NOx adsorption at 300° C. NiFe$_2$O$_4$ exhibits peaks at 1565, 1257, and 1004 cm$^{-1}$ wavenumbers. These peaks are corresponding to bidentate or bridging nitrate intermediates. As shown in FIG. 5, the deposition of 0.5 wt % on the NiFe$_2$O$_4$ exhibits additional peaks at 1480, 1193, 1070 cm$^{-1}$ wavenumbers along with the nitrate peaks. These peaks are due to nitrite intermediates. Because of the broadness of the 1480 cm$^{-1}$ peak, it may be difficult to make a detailed assignment and differentiate between bridging nitro-nitrito or mono-dentate nitrite species. However, it is clear that NiFe$_2$O$_4$ forms nitrate intermediates, and potassium promotion leads to the nitrite intermediates. FIG. 5 shows that the intensities of the peaks due to the nitrate species decreases with increasing potassium loading, and disappear completely for the 1.5 wt % K/NiFe$_2$O$_4$ sample.

Prior studies have reported that the nitrate species formed on Ba/MgO are spectator species in the NO decomposition reaction and actually poison the reaction sites due to their strong adsorption. Prior studies also reported that nitrite intermediates are very active and readily decompose to N$_2$ and O$_2$. With the present technology, deposition of potassium leads to the formation of nitrite intermediates and improves the direct NOx activity and selectivity of the NiFe$_2$O$_4$ catalyst. The 1.5 wt % K/NiFe$_2$O$_4$ only forms nitrite intermediates, and for this reason, this catalyst exhibits 100% selectivity towards N$_2$ at 450° C.

Figure 6:
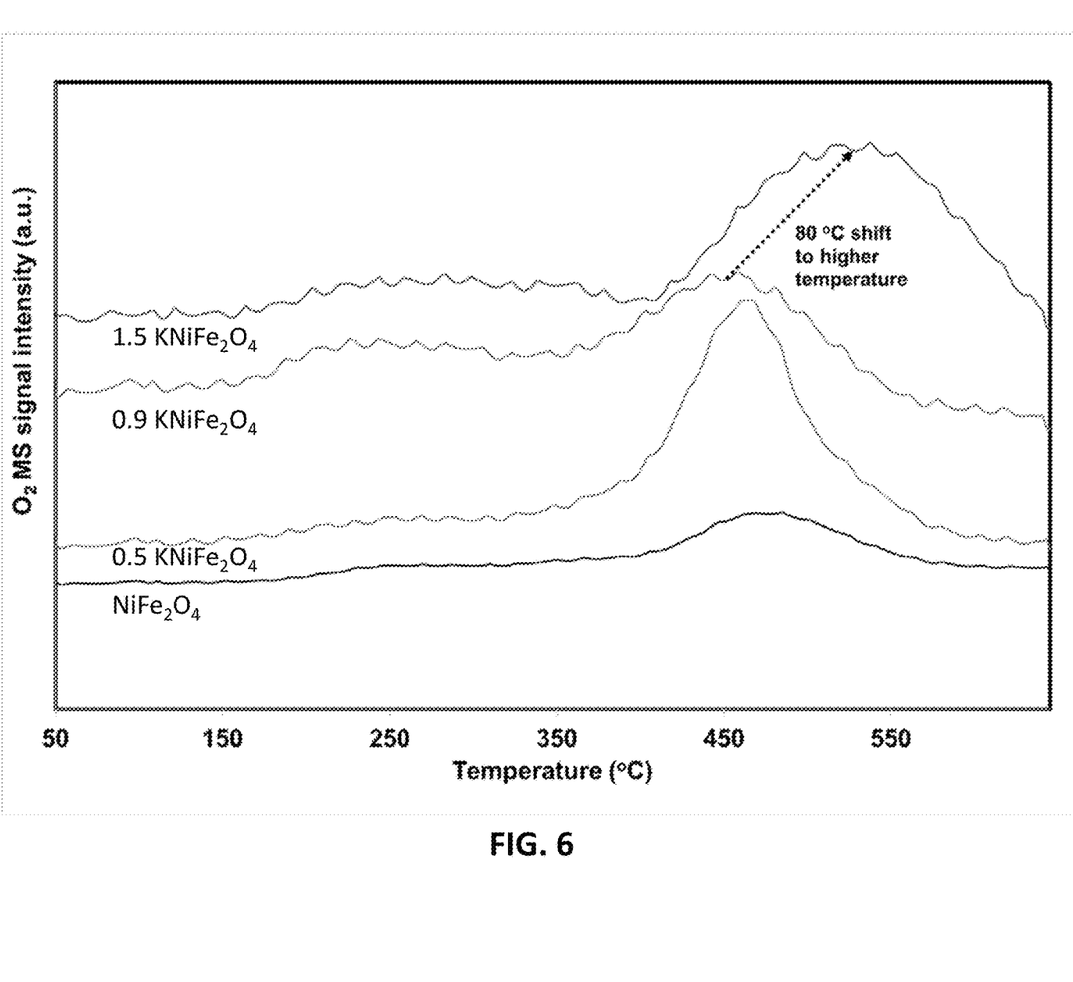
FIG. 6 illustrates $O_2$-TPD profiles of the $NiFe_2O_4$ and $K/NiFe_2O_4$ catalysts at various weight percentages.

The oxygen release characteristics of the NiFe$_2$O$_4$ and K/NiFe$_2$O$_4$ catalyst systems can be studied using O$_2$-TPD measurements. FIG. 6 illustrates the O$_2$-TPD profiles of the NiFe$_2$O$_4$ and K/NiFe$_2$O$_4$ catalyst systems. Oxygen release at lower temperature is one of the important factors that leads to direct NOx decomposition activity because the release/desorption of oxygen as molecular O$_2$ in a stoichiometric ratio to N$_2$ formation is a requirement of this reaction. The O$_2$-TPD profiles of FIG. 6 are presented with temperature as a function of the amount of oxygen released. For the pure NiFe$_2$O$_4$ spinel, no physisorbed oxygen release is observed. Chemisorbed oxygen released between 150° C.-350° C., and the bulk oxygen release started at 375° C. and finished at 590° C. Both 0.5 wt % K/NiFe$_2$O$_4$ and 0.9 wt % K/NiFe$_2$O$_4$ catalyst exhibited a similar O$_2$-TPD profile to the NiFe$_2$O$_4$ spinel, and also there is not much change in the bulk oxygen release peak temperature. On the other hand, the 1.5 wt % K/NiFe$_2$O$_4$ releases bulk oxygen at much higher temperature (note the annotated 80° C. shift in the peak) as compared to the NiFe$_2$O$_4$, 0.5 wt % K/NiFe$_2$O$_4$, and 0.9 wt % K/NiFe$_2$O$_4$ catalysts. These results suggest that potassium may inhibit the oxygen release of NiFe$_2$O$_4$ after 0.9 wt % deposition, and that this factor may be responsible for the decrease in direct NOx decomposition activity beyond the optimum loading of 0.9 wt % K/NiFe$_2$O$_4$ as discussed above and with renewed reference to FIG. 1.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalytic converter for the direct decomposition removal of $NO_x$ from an exhaust gas stream flowing at a temperature of from about 400° C. to about 650° C., the catalytic converter comprising:
   an inlet configured to receive the exhaust gas stream into an enclosure;
   an outlet configured to allow the exhaust gas stream to exit the enclosure; and
   a catalyst system contained inside the enclosure, the catalyst system comprising potassium (K) dispersed on a $NiFe_2O_4$ spinel oxide, configured to catalyze a reduction of the NOx to generate $N_2$ without the presence of a reductant.

2. The catalytic converter according to claim 1, wherein the $NiFe_2O_4$ spinel oxide is in a nanoparticle form, having an average diameter of from about 2 nm to about 100 nm.

3. The catalytic converter according to claim 1, wherein the K is dispersed on a surface of the spinel oxide and provided in an amount of from about 0.5 wt % to about 1.0 wt % of the catalyst system.

4. The catalytic converter according to claim 3, wherein the K is dispersed on a surface of the spinel oxide and provided in an amount of about 0.9 wt % of the catalyst system.

5. The catalytic converter according to claim 4, configured to flow the exhaust gas stream through the catalyst system at a temperature at or greater than about 500° C. and obtaining an NOx selectivity to $N_2$ greater than about 95%.

6. The catalytic converter according to claim 1, wherein the K is dispersed on a surface of the spinel oxide and provided in an amount of about 1.5 wt % of the catalyst system, and the catalytic converter is configured to flow the exhaust gas stream through the catalyst system at a temperature at or greater than about 450° C. and obtaining an NOx selectivity to $N_2$ of about 100%.

7. A method for direct decomposition removal of $NO_x$ from an exhaust gas stream, the method comprising:
   flowing the exhaust gas stream through a catalytic converter and exposing the exhaust gas stream to a catalyst system comprising potassium (K) dispersed on a surface of a $NiFe_2O_4$ spinel oxide; and
   catalyzing a reduction of the NOx to generate $N_2$ without the presence of a reductant.

8. The method according to claim 7, comprising flowing the exhaust gas stream through the catalyst system at a temperature of from about 400° C. to about 650° C.

9. The method according to claim 7, wherein the K is provided in an amount of from about 0.5 wt % to about 1.0 wt % of the catalyst system.

10. The method according to claim 7, wherein the K is provided in an amount of from about 0.75 wt % to about 1.0 wt % of the catalyst system.

11. The method according to claim 7, wherein the K is provided in an amount of about 0.9 wt % of the catalyst system.

12. The method according to claim 11, comprising flowing the exhaust gas stream through the catalyst system at a temperature at or greater than about 500° C. and obtaining an NOx selectivity to $N_2$ greater than about 95%.

13. The method according to claim 7, wherein the K is dispersed on a surface of the spinel oxide and provided in an amount of about 1.5 wt % of the catalyst system, and the method comprises flowing the exhaust gas stream through the catalyst system at a temperature at or greater than about 450° C. and obtaining an NOx selectivity to $N_2$ of about 100%.

* * * * *